Patented Nov. 6, 1928.

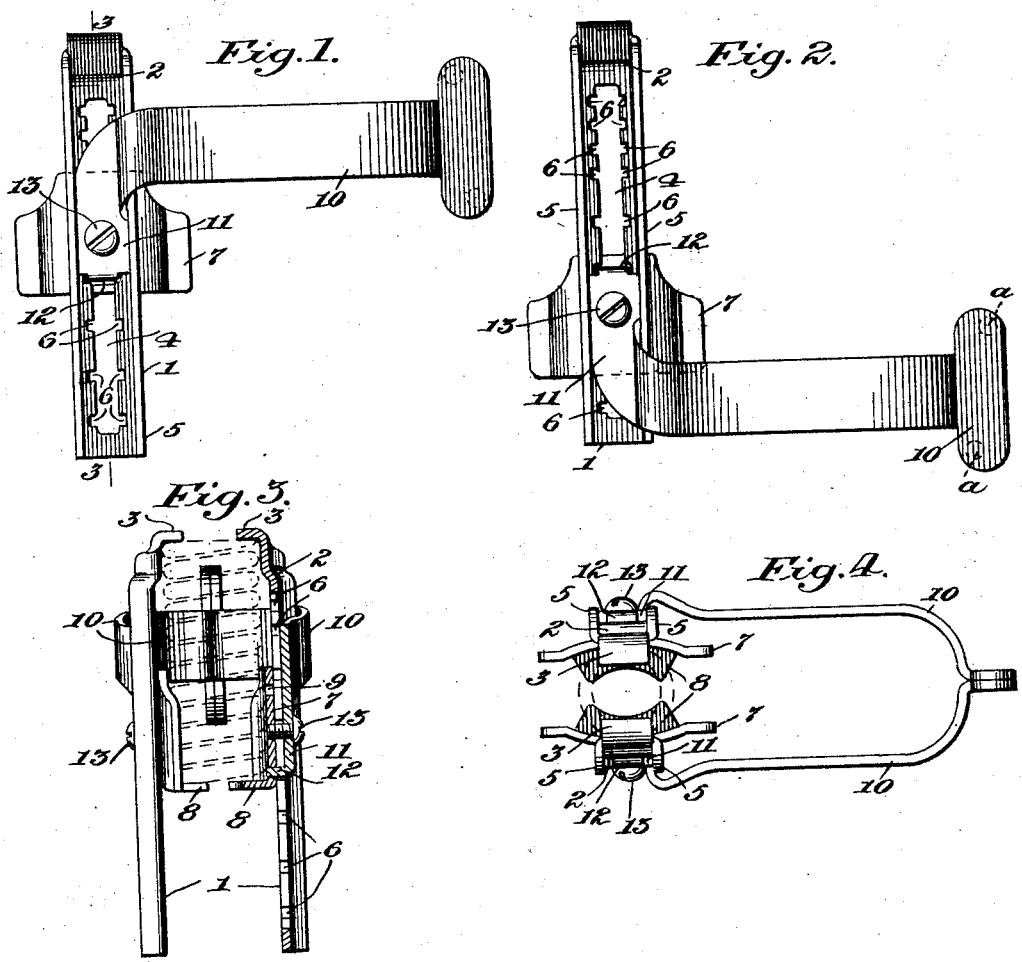

1,690,731

UNITED STATES PATENT OFFICE.

HARRY W. KULP AND MARTIN C. DELLINGER, OF LANCASTER, PENNSYLVANIA.

SPRING HOLDING AND POSITIONING CLIP.

Application filed July 22, 1927. Serial No. 207,691.

Our invention relates to clips for holding compressed helical springs and for placing them in operative position and is intended primarily for use in connection with the valve springs in internal combustion engines as mounted and arranged with relation to the other elements of various constructions of automobiles, trucks, busses and tractors.

In the automotive field the conditions governing accessibility to the valve stems, valve springs, valve spring seats and valve spring seat retaining keys differ through a wide range, according to the design of engine, the arrangement of the steering gear, the carbureter, generator, and other mechanism. In some there is great accessibility, in others access is very difficult; some may have a small opening with a depending part in the way so that the spring must be inserted behind it, another a small opening with conditions just reversed, or one of the associated mechanisms may make access difficult.

In some instances in making repairs or conditioning an engine it is necessary to bodily remove the valve springs and with the heavier more powerful valve springs much difficulty is encountered in replacing them, particularly when their normal or operative position is difficult of access because of the conditions above referred to.

The primary object of the present invention is to provide an adjustable clip for holding a compressed valve spring and arranging it in operative position, and of such construction as to be practically universally applicable to all known puppet valve types of engines as now known, used and arranged in the automotive field and, in furtherance of this primary object, to provide a clip having a handle and separate jaws adapted to be secured to said handle in various positions of adjustment to suit a wide range of lengths of springs as compressed; to provide an offset construction of handle to provide for two possible positions thereof with respect to the jaws in each adjusted position of the latter to promote its positioning efficiency; and to provide a combination of handle and jaws for positively locking the jaws in adjusted position and preventing unintentional relative movement between said jaws and handle.

In this application we show and describe only the present preferred embodiment of our invention, simply by way of illustration of the practice of our invention as by law required. However, we recognize that our invention is capable of other and different embodiments, and that the various details thereof may be modified in various ways, all without departing from my said invention; therefore, the drawing and description herein are to be considered as illustrative and not as exclusive.

In the accompanying drawings made to full size scale from an actual commercial clip:

Figure 1 represents a side elevation of a clip embodying the preferred form of our invention with the handle in one position.

Figure 2, a view similar to Figure 1 with a different adjustment as to length of spring-confining space, and showing the handle in reverse adjusted position.

Figure 3, a partial sectional view on the line 3—3 of Figure 1, and

Figure 4, a top plan view of the clip as shown in Figure 1.

Referring now in detail to the drawings, 1 designates two long jaw bars offset inward at 2 a little below their respective jaws 3 for a distance substantially equal to the thickness of the adjustable plates 7 carrying respectively jaws 8 and slotted longitudinally, as at 4, between the bracing guide and stop side flanges or ribs 5 from a point near their respective lower ends to a point near the points of their respective offsets 2, the side walls of said slots being cut out in the same plane at intervals to provide a plurality of pairs of adjusting notches 6 to receive the locking tongue 12 respectively of the offset ends 11 of the handle 10.

The ends 11 of the handle 10 are offset not only in a vertical plane with relation to the handle but also inward toward each other in a horizontal plane and are of such width as to make a nice, snug fit between the guide or stop flanges 5 of the respective bars 1 and have parallel straight side edges of substantial length to engage with the adjacent opposed straight faces of said flanges 5 to prevent relative movement between the respective offset ends 11 and their cooperating bars 1.

The adjustable plates 7 are each formed with a central internally screw threaded perforation and two horizontally extending slots 9 of such size as to just snugly receive the locking tongue 12 of the cooperating offset end 11 of the handle 10, said slots being equidistantly spaced from, and on opposite sides of said central perforation and so located that when said jaws 8 are disposed horizontally they, said slots 9, will be disposed in the same vertical plane and transversely of the slot 4 of the corresponding bar 1 and so as to be brought by a vertical movement of their plate 7 into registry with any desired pair of notches 6 in the opposed wall of slot 4 of said corresponding bar 1.

Each offset end 11 of handle 10 is perforated at a point in registry, in assembled relation, with the perforation in the cooperating adjustable plate 7 and a screw 13 extending through said offset end 11 and screwing into the cooperating adjustable plate 7 serves to hold the parts firmly together in adjusted position with the locking tongue 12 of said offset end 11 in either one of the slots 9 of the cooperating adjustable plate 7, according to the particular position of adjustment, with the opposing faces of the said offset end 11 and adjustable plate 7 clamped tightly against the adjacent faces of the intervening portion of the bar 1, preventing relative movement in a transverse plane, and with the long side edges of said offset end 11 in contact with the opposed faces of the bracing and guiding stop flanges or ribs 5 preventing relative movement between the parts in a longitudinal plane.

From the foregoing it follows that the lower jaws 8 may be adjusted through a wide range of adjustments toward or from the jaws 3 to suit any length of a particular spring in a compressed state, and that in case, as the parts are assembled, for instance, with the tongues 12 in the lower cooperating slots 9 of the respective plates 7, the handle 10 comes into contact with some part of the engine or crank case or some adjacent part or mechanism, interfering with the insertion and positioning of the spring, the latter may be returned to the compressor, not shown, and the clip disassembled and then reassembled with the jaws 8 in substantially the same adjusted position with relation to the jaws 3, but with the offset ends 11 of the handle 10 presented upwardly, as in Figure 2, instead of downwardly, as in Figure 1, thereby providing greater clearance and facilitating the easy and quick insertion and operative positioning of the spring.

In use the legs of the handle 10 will be gripped in one hand and so pressed toward each other against the intervening compressed spring. After the spring has been properly positioned and the valve stem inserted the clip may be pulled out, leaving the spring in place, the arms of the clip yielding in the process to release the spring.

The plates 7 will be slightly arcuate to fit around the spring and prevent it from buckling, and for the same reason the upper portions of the bars 1 are offset at 2 so as to be in contact with the peripheral face of the spring adjacent to the upper jaws 2.

The expressions "upper," "lower," "horizontal" and "vertical" used herein are to be understood and interpreted merely as terms for conveniently defining the relative arrangement of the various parts as shown in the drawings, it being obvious that if one of the actual clips be placed on a flat surface it may rest on the handle 10 and either end of the bars 1 or on its side, but in such case the relative arrangement of the parts would remain the same.

The embodiment illustrated was designed with particular regard for manufacture on a large production basis by sheet metal stamping and forming operations. However, any suitable materials may be used and it may be manufactured in any manner found practicable.

In the embodiment illustrated the handle 10 is formed of two duplicate parts, intended to be fashioned by the same die, said duplicate parts being preferably spot welded together at several points, as indicated at $a$, though this is a mere matter of economy of manufacture and preference, and it is not essential that the handle 10 be constituted of several parts, and, as shown, it functions the same as though it were of a single integral piece.

Having thus described our invention, what we claim as new and desire to secure by Letters Patent is:

1. An adjustable spring holding and positioning clip consisting of a bifurcated handle having the end portions of its legs offset inwardly toward each other and vertically with respect to said legs and formed with long, straight parallel side edge faces and provided at their respective extreme ends with wide tongues presented toward each other, in combination with long bars respectively cooperating with said legs and provided at one end with rigid jaws presented toward each other, adjustable plates respectively cooperating with said bars and provided with rigid jaws presented toward each other and together constituting a pair of jaws opposed to the pair of jaws of said bars, and means for clamping the respective adjustable plates and the respective offset end portions of said legs in adjusted position against the opposed faces of the intervening portions of the respective bars, each of said plates being provided with two slots each adapted to receive its cooperating tongue of the cooperating offset end portion according to the position of the handle, and each said bar being longitudinally slotted, having the walls of its slot formed with pairs of opposing notches to together receive said tongue in any one of several adjusted positions, and each said bar being formed with bracing and stop flanges having opposing faces spaced at such distance as to just snugly receive between them said offset end portion and to be respectively engaged by the respective long, straight parallel side edge faces thereof.

2. An adjustable spring holding and positioning clip consisting of a bifurcated handle having the end portions of its legs offset inwardly toward each other and vertically with respect to said legs and provided at their respective extreme ends with wide tongues presented toward each other, in combination with long bars respectively cooperating with said legs and provided at one end with rigid jaws presented toward each other, adjustable plates respectively cooperating with said bars and provided with rigid jaws presented toward each other and together constituting a pair of jaws opposed to the pair of jaws of said bars, and a screw for clamping the respective adjustable plates and the respective offset end portions of said legs in adjusted position against the opposed faces of the intervening portions of the respective bars, each of said plates being provided with two slots each adapted to receive its cooperating tongue of the cooperating offset end portion according to the position of the handle, and each said bar being longitudinally slotted, having the walls of its slot formed with pairs of opposing notches to together receive said tongue in any one of several adjusted positions.

3. An adjustable spring holding and positioning clip consisting of a bifurcated handle having the end portions of its legs offset laterally and vertically with respect to said legs and provided at their respective extreme ends with wide tongues presented toward each other, in combination with long bars respectively cooperating with said legs and provided at one end with rigid jaws presented toward each other, adjustable plates respectively cooperating with said bars and provided with rigid jaws presented toward each other and together constituting a pair of jaws opposed to the pair of jaws of said bars, and means for clamping the respective adjustable plates and the respective offset end portions of said legs in adjusted position against the opposed faces of the intervening portions of the respective bars, each of said plates being provided with two slots each adapted to receive its cooperating tongue of the cooperating offset end portion according to the position of the handle.

4. An adjustable spring holding and positioning clip consisting of a bifurcated handle having the end portions of its legs offset laterally and vertically with respect to said legs, in combination with long bars respectively cooperating with said legs and provided at one end with rigid jaws presented toward each other, adjustable plates respectively cooperating with said bars and provided with rigid jaws presented toward each other and together constituting a pair of jaws opposed to the pair of jaws of said bars, and means for clamping the respective adjustable plates and the respective offset end portions of said legs in adjusted position against the opposed faces of the intervening portions of the respective bars, and means for preventing unintentional relative movement between the respective offset end portions, bars and plates.

5. An adjustable spring holding and positioning clip consisting of a bifurcated handle having the end portions of its legs offset vertically with respect to said legs and provided at their respective extreme ends with wide tongues presented toward each other, in combination with long bars respectively cooperating with said legs and provided at one end with rigid jaws presented toward each other, adjustable plates respectively cooperating with said bars and provided with rigid jaws presented toward each other and together constituting a pair of jaws opposed to the pair of jaws of said bars, and means for clamping the respective adjustable plates and the respective offset end portions of said legs in adjusted position against the opposed faces of the intervening portions of the respective bars, each of said plates being provided with two slots each adapted to receive its cooperating tongue of the cooperating offset end portion according to the position of the handle.

6. An adjustable spring holding and positioning clip consisting of a bifurcated handle having the end portions of its legs offset vertically with respect to said legs, in combination with bars having jaws, and means for adjustably securing the respective offset end portions of said legs to the respective bars in either of two reverse presentations of said offset end portions whereby said handle may extend in either of two different planes with substantially the same relative position of said jaws.

In testimony whereof, we have signed our names to this specification at Lancaster, Pennsylvania, this 30th day of June, 1927.

HARRY W. KULP.
MARTIN C. DELLINGER.